(12) United States Patent
Cao et al.

(10) Patent No.: US 10,516,502 B2
(45) Date of Patent: Dec. 24, 2019

(54) FILE REPAIR METHOD, RELATED APPARATUS, AND SYSTEM

(71) Applicant: Huawei Technologies Co., Ltd., Shenzhen (CN)

(72) Inventors: Longyu Cao, Shanghai (CN); Yong Yu, Nanjing (CN); Zhiming Li, Reading (GB)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 259 days.

(21) Appl. No.: 15/631,343

(22) Filed: Jun. 23, 2017

(65) Prior Publication Data
US 2017/0302403 A1  Oct. 19, 2017

Related U.S. Application Data

(63) Continuation of application No. PCT/CN2014/094963, filed on Dec. 25, 2014.

(51) Int. Cl.
*G06F 11/07* (2006.01)
*H04L 1/00* (2006.01)
(Continued)

(52) U.S. Cl.
CPC .............. *H04L 1/004* (2013.01); *H04L 12/18* (2013.01); *H04N 21/637* (2013.01); *G06F 11/07* (2013.01);
(Continued)

(58) Field of Classification Search
CPC .. G06F 11/0793; G06F 11/07; G06F 11/0709; G06F 11/0751; H04L 65/4076; H04L 65/607
See application file for complete search history.

(56) References Cited

U.S. PATENT DOCUMENTS 7,596,567 B2 * 9/2009 Lai ..................... H04L 1/1867
8,341,479 B2 * 12/2012 Bichot ................ H04L 1/1867
714/4.1
(Continued)

FOREIGN PATENT DOCUMENTS

CN  1957554 A  5/2007
CN  101877641 A  11/2010
(Continued)

OTHER PUBLICATIONS

"File Repair Correction to Support Multiple FLUTE Sessions," Source to WG: Huawei Technologies Co. Ltd,, Source to TSG: S4, Work Item Code: TEI, Category F, Change Request, 26.346 CR 0442 Current version: 12.4.0, 3GPP TSG-SA4 Meeting #82, S4-150112, Jan. 26-30, 2015, 10 pages.

(Continued)

*Primary Examiner* — Nadeem Iqbal
(74) *Attorney, Agent, or Firm* — Slater Matsil, LLP

(57) ABSTRACT

A file repair method includes receiving, by a broadcast/multicast service center, a file repair request message sent by user equipment, where the file repair request message includes a Uniform Resource Identifier (URI) corresponding to file data to be repaired and a transmit session identifier of a File Delivery over Unidirectional Transport FLUTE session that transmits the file data. The method further includes determining, according to the transmit session identifier, the FLUTE session that transmits the file data, and determining repair data of the file data according to the FLUTE session that transmits the file data and further according to the URI corresponding to the file data.

12 Claims, 4 Drawing Sheets

---

A broadcast/multicast service center receives a file repair request message sent by user equipment, where the file repair request message includes a URI corresponding to file data to be repaired and a transmit session identifier of a FLUTE session that transmits the file data — S401

The broadcast/multicast service center determines repair data of the file data according to the transmit session identifier and the URI corresponding to the file data — S402 he broadcast/multicast service center sends the repair data of the file data to the user equipment — S403

(51) Int. Cl.
*H04L 12/18* (2006.01)
*H04N 21/637* (2011.01)
*H04L 29/06* (2006.01)

(52) U.S. Cl.
CPC .. *H04L 65/4076* (2013.01); *H04L 2001/0092* (2013.01)

(56) References Cited

U.S. PATENT DOCUMENTS

| | | | |
|---|---|---|---|
| 9,213,605 B2* | 12/2015 | Oyman | H04W 4/06 |
| 9,215,084 B2* | 12/2015 | Perkuhn | G06Q 30/02 |
| 2006/0023652 A1* | 2/2006 | Vedantham | H04L 12/1868 370/312 |
| 2006/0023732 A1 | 2/2006 | Vedantham et al. | |
| 2006/0069802 A1 | 3/2006 | Vedantham et al. | |
| 2009/0204865 A1 | 8/2009 | Leon et al. | |
| 2010/0050032 A1 | 2/2010 | Bichot et al. | |
| 2015/0267355 A1 | 9/2015 | Hofstaetter | |
| 2015/0270978 A1* | 9/2015 | Shrader | H04L 1/16 370/216 |

FOREIGN PATENT DOCUMENTS

| | | |
|---|---|---|
| CN | 103780405 A | 5/2014 |
| WO | 2014063730 A1 | 5/2014 |
| WO | 2014063770 A1 | 5/2014 |

OTHER PUBLICATIONS

"Universal Mobile Telecommunications System (UMTS); LTE; Multimedia Broadcast/Multicast Service (MBMS); Protocols and codecs (3GPP TS 26.346 version 12.3.0 Release 12)," ETSI TS 126 346 V12.3.0, Oct. 2014, 204 pages.

"3rd Generation Partnership Project; Technical Specification Group Services and System Aspects; Multimedia Broadcast/Multicast Service (MBMS); Protocols and codecs (Release 12)," 3GPP TS 26.346 V12.4.0, Dec. 2014, 207 pages.

Fielding, R. et al., "Hypertext Transfer Protocol—HTTP/1.1," Network Working Group, Request for Comments: 2616, Obsoletes: 2068, Category: Standards Track, Jun. 1999, 114 pages.

"3rd Generation Partnership Project; Technical Specification Group Services and System Aspects; Multimedia Broadcast/Multicast Service (MBMS); Protocols and codecs (Release 6)," 3GPP TS 26.346 V6.1.0, Jun. 2005, 100 pages.

"Universal Mobile Telecommunications System (UMTS); Multimedia Broadcast/Multicast Service (MBMS); Protocols and codecs (3GPP TS 26.346 version 6.1.0 Release 6)," ETSI TS 126 346 V6.1.0, Jun. 2005, 102 pages.

* cited by examiner

File file

| URI | | | | | | | |
|---|---|---|---|---|---|---|---|
| TOI | | TOI | | TOI | | TOI | |
| SBN | SBN | SBN | SBN | SBN | SBN | SBN | SBN |
| ESI ESI | ESI ESI | ESI ESI | ESI ESI | ESI ESI | ESI ESI | ESI ESI | ESI ESI |

TOI: transport object identifier　　　SBN: source block number

URI: uniform resource identifier　　　ESI: encoding symbol identifier

FILE REPAIR METHOD, RELATED APPARATUS, AND SYSTEM

CROSS-REFERENCE TO RELATED APPLICATIONS

This application is a continuation of International Application No. PCT/CN2014/094963, filed on Dec. 25, 2014, the disclosure of which is hereby incorporated by reference in its entirety.

TECHNICAL FIELD

Embodiments of the present application relate to communications technologies, and in particular, to a file repair method, a related apparatus, and a system.

BACKGROUND

A multimedia broadcast/multicast service (MBMS) is a technology for transmitting data from a data source to multiple receive ends (such as user equipment) by means of a shared network resource. While providing a multimedia service, the multimedia broadcast/multicast service can effectively use the network resource, and implement high-rate multimedia broadcast and multicast. An evolved multimedia broadcast/multicast service (eMBMS) technology (also referred to as LTE (Long Term Evolution) broadcast) is an LTE-technology-based evolved broadcast/multicast function that develops based on the MBMS technology. The eMBMS technology is dramatically improved in such aspects as a logical architecture, a transmission manner, and a channel structure, and can support a broader bandwidth and provide better experience for a user.

The eMBMS technology uses a point-to-multipoint transmission manner of a File Delivery over Unidirectional Transport (FLUTE) protocol defined by the Internet Engineering Task Force. By using the point-to-multipoint transmission manner of the FLUTE protocol, content that needs to be transmitted is converted to multiple FLUTE files, each file is processed in a particular manner and encapsulated into a FLUTE packet during transmission, and the FLUTE packet is transmitted to multiple receive ends by means of the Internet. Within a specified time interval, a service of transmitting MBMS user data on a FLUTE channel by means of the FLUTE communication protocol may be referred to as a FLUTE session. Files corresponding to data of a same service are sent to multiple receive ends by means of only one FLUTE session. If data is lost or damaged in a transmission process of the FLUTE packet, user equipment (UE) on the receive end may request, by using a uniform resource identifier (URI) of the file, a file repair server to repair data.

As the eMBMS technology develops, a multi-FLUTE-session feature is proposed in the 3GPP R12 standards, that is, data of a same service that the UE is concerned with/is interested in may be transmitted to the user in multiple FLUTE sessions, and the user may freely select to receive a FLUTE packet corresponding to the service in whichever FLUTE session. However, for the problem that data is lost or damaged in the transmission process of the FLUTE packet, a solution provided in the prior art is effective only when a same service can be sent to the receive end by using only one FLUTE session, and if data is lost or damaged under the multi-FLUTE-session feature, data cannot be repaired.

SUMMARY

Embodiments of the present application provide a file repair method, a related apparatus, and a system, to perform file repair for a data loss or data damage problem caused in the case of a multi-FLUTE-session feature.

According to a first aspect, an embodiment of the present application provides a file repair method, where the method includes receiving, by a broadcast/multicast service center, a file repair request message sent by user equipment, where the file repair request message includes a Uniform Resource Identifier URI corresponding to file data to be repaired and a transmit session identifier of a File Delivery over Unidirectional Transport FLUTE session that transmits the file data, determining, by the broadcast/multicast service center, repair data of the file data according to the transmit session identifier and the URI corresponding to the file data; and sending, by the broadcast/multicast service center, the repair data of the file data to the user equipment.

With reference to the first aspect, in a first possible implementation manner, the repair data of the file data is data in at least one of the following forms: a FLUTE file corresponding to the file data, an encoding symbol of the file data, a new encoding symbol obtained after re-encoding is performed according to the encoding symbol of the file data, and a byte corresponding to the file data.

With reference to the first aspect, or the first possible implementation manner of the first aspect, in a second possible implementation manner, the file repair request message further includes at least one type of information of a source block number SBN of the file data, an encoding symbol identifier ESI of the file data, or a byte range of the file data, and/or the file repair request message is a symbol-based file repair request message or a byte-range-based file repair request message.

With reference to the first aspect, or the first or the second possible implementation manner of the first aspect, in a third possible implementation manner, the determining, by the broadcast/multicast service center, repair data of the file data according to the transmit session identifier and the URI corresponding to the file data includes obtaining, by the broadcast/multicast service center, the FLUTE file corresponding to the file data according to the transmit session identifier and the URI corresponding to the file data, where the repair data of the file data is the FLUTE file corresponding to the file data, or determining, by the broadcast/multicast service center, the encoding symbol of the file data according to the SBN of the file data or the ESI of the file data, the transmit session identifier, and the URI corresponding to the file data, where the repair data of the file data is the encoding symbol of the file data, or determining, by the broadcast/multicast service center, the encoding symbol of the file data according to the SBN of the file data or the ESI of the file data, the transmit session identifier, and the URI corresponding to the file data, and performing re-encoding according to the encoding symbol of the file data to obtain a new encoding symbol, where the repair data of the file data is the encoding symbol of the file data, or determining, by the broadcast/multicast service center, the byte corresponding to the file data according to the transmit session identifier, the URI corresponding to the file data, and the byte range of the file data, where the repair data of the file data is the byte corresponding to the file data.

With reference to the first aspect, or the first, the second, or the third possible implementation manner of the first aspect, in a fourth possible implementation manner, the determining, by the broadcast/multicast service center, repair data of the file data according to the transmit session identifier and the URI corresponding to the file data includes: determining, by the broadcast/multicast service center according to the transmit session identifier, the FLUTE session that transmits the file data; and determining, by the broadcast/multicast service center, the repair data of the file data according to the FLUTE session that transmits the file data and the URI corresponding to the file data.

According to a second aspect, an embodiment of the present application provides a file repair method, including sending, by user equipment, a file repair request message to a broadcast/multicast service center, where the file repair request message includes a Uniform Resource Identifier URI corresponding to file data to be repaired and a transmit session identifier of a File Delivery over Unidirectional Transport FLUTE session that transmits the file data, and receiving, by the user equipment, repair data of the file data, the repair data of the file data being returned by the broadcast/multicast service center according to the file repair request message.

With reference to the second aspect, in a first possible implementation manner, the method further includes: obtaining, by the user equipment, the transmit session identifier.

With reference to the second aspect, or the first possible implementation manner of the second aspect, in a second possible implementation manner, the repair data of the file data is data in at least one of the following forms: a FLUTE file corresponding to the file data, an encoding symbol of the file data, a new encoding symbol obtained after re-encoding is performed according to the encoding symbol of the file data, and a byte corresponding to the file data.

According to a third aspect, an embodiment of the present application provides a broadcast/multicast service center, including, a receiving unit, configured to receive a file repair request message sent by user equipment, where the file repair request message includes a Uniform Resource Identifier URI corresponding to file data to be repaired and a transmit session identifier of a File Delivery over Unidirectional Transport FLUTE session that transmits the file data, a processing unit, configured to determine repair data of the file data according to the transmit session identifier and the URI corresponding to the file data, and a sending unit, configured to send the repair data of the file data to the user equipment.

With reference to the third aspect, in a first possible implementation manner, the repair data of the file data is data in at least one of the following forms: a FLUTE file corresponding to the file data, an encoding symbol of the file data, a new encoding symbol obtained after re-encoding is performed according to the encoding symbol of the file data, and a byte corresponding to the file data.

With reference to the third aspect, or the first possible implementation manner of the third aspect, in a second possible implementation manner, the file repair request message further includes at least one type of information of a source block number SBN of the file data, an encoding symbol identifier ESI of the file data, or a byte range of the file data and/or the file repair request message is a symbol-based file repair request message or a byte-range-based file repair request message.

With reference to the third aspect, or the first or the second possible implementation manner of the third aspect, in a third possible implementation manner, the processing unit is specifically configured to obtain the FLUTE file corresponding to the file data according to the transmit session identifier and the URI corresponding to the file data, where the repair data of the file data is the FLUTE file corresponding to the file data, or the processing unit is specifically configured to determine the encoding symbol of the file data according to the SBN of the file data or the ESI of the file data, the transmit session identifier, and the URI corresponding to the file data, where the repair data of the file data is the encoding symbol of the file data, or the processing unit is specifically configured to: determine the encoding symbol of the file data according to the SBN of the file data or the ESI of the file data, the transmit session identifier, and the URI corresponding to the file data, and perform re-encoding according to the encoding symbol of the file data to obtain a new encoding symbol, where the repair data of the file data is the encoding symbol of the file data, or the processing unit is specifically configured to determine the byte corresponding to the file data according to the transmit session identifier, the URI corresponding to the file data, and the byte range of the file data, where the repair data of the file data is the byte corresponding to the file data.

With reference to the third aspect, or the first, the second, or the third possible implementation manner of the third aspect, in a fourth possible implementation manner, the processing unit is specifically configured to determine, according to the transmit session identifier, the FLUTE session that transmits the file data; and the broadcast/multicast service center determines the repair data of the file data according to the FLUTE session that transmits the file data and the URI corresponding to the file data.

According to a fourth aspect, an embodiment of the present application provides user equipment, including a sending unit, configured to send a file repair request message to a broadcast/multicast service center, where the file repair request message includes a Uniform Resource Identifier URI corresponding to file data to be repaired and a transmit session identifier of a File Delivery over Unidirectional Transport FLUTE session that transmits the file data, and a receiving unit, configured to receive repair data of the file data, the repair data of the file data being returned by the broadcast/multicast service center according to the file repair request message.

According to a fifth aspect, an embodiment of the present application provides a broadcast/multicast service center, including a bus, and a processor, a memory, a transmitter, and a receiver that are connected to the bus; and the memory is configured to store a computer executable instruction, and the computer executable instruction is configured to be executed by the processor. The receiver is configured to receive a file repair request message sent by user equipment, where the file repair request message includes a Uniform Resource Identifier URI corresponding to file data to be repaired and a transmit session identifier of a File Delivery over Unidirectional Transport FLUTE session that transmits the file data. A processor is configured to determine repair data of the file data according to the transmit session identifier and the URI corresponding to the file data. The transmitter is further configured to send the repair data of the file data to the user equipment.

In the fifth aspect, for specific information and an implementation manner of the file repair request and the repair data of the file data, refer to any possible implementation manner of the third aspect, for how the processor determines the repair data of the file data, refer to any possible implementation manner of the third aspect.

According to a sixth aspect, an embodiment of the present application provides user equipment, including a bus, and a processor, a memory, a transmitter, and a receiver that are connected to the bus; and the memory is configured to store a computer executable instruction, and the computer executable instruction is configured to be executed by the processor, the transmitter is configured to send a file repair request message to a broadcast/multicast service center, where the file repair request message includes a Uniform Resource Identifier URI corresponding to file data to be repaired and a transmit session identifier of a File Delivery over Unidirectional Transport FLUTE session that transmits the file data, and the receiver is configured to receive repair data of the file data, the repair data of the file data being returned by the broadcast/multicast service center according to the file repair request message.

With reference to the sixth aspect, in a first possible implementation manner, the processing unit is further configured to obtain the transmit session identifier.

In the sixth aspect or the first possible implementation manner of the sixth aspect, for specific information and an implementation manner of the file repair request and the repair data of the file data, refer to any possible implementation manner of the fourth aspect.

According to a seventh aspect, an embodiment of the present application provides a computer readable medium, which includes a computer executable instruction, and when a processor of a computer executes the computer executable instruction, the computer executes the file repair method according to the first aspect or the file repair method according to any possible implementation manner of the first aspect.

According to an eighth aspect, an embodiment of the present application provides a computer readable medium, which includes a computer executable instruction, and when a processor of a computer executes the computer executable instruction, the computer executes the file repair method according to the second aspect or the file repair method according to any possible implementation manner of the second aspect.

According to the file repair method provided in the embodiments of the present application, a broadcast/multicast service center receives a file repair request message sent by user equipment and obtains a URI corresponding to file data to be repaired and a transmit session identifier of a FLUTE session that transmits the file data, so that the broadcast/multicast service center can perceive, by using the transmit session identifier, by which FLUTE session the file data is transmitted, and can obtain repair data of the file data by using the URI corresponding to the file data, thereby implementing file repair, and resolving a prior-art problem that file repair cannot be processed in the case of a multi-FLUTE-session feature.

BRIEF DESCRIPTION OF THE DRAWINGS

To describe the technical solutions in the embodiments of the present application more clearly, the following briefly describes the accompanying drawings required for describing the embodiments or in the prior art. Apparently, the accompanying drawings in the following description show merely some embodiments of the present application, and a person of ordinary skill in the art may still derive other drawings from these accompanying drawings without creative efforts.

DETAILED DESCRIPTION OF ILLUSTRATIVE EMBODIMENTS

Embodiments of the present application provide a file repair method, a related apparatus, and a system, to perform file repair to resolve a data loss or data damage problem caused in the case of a multi-FLUTE-session feature.

Figures 1, 2:
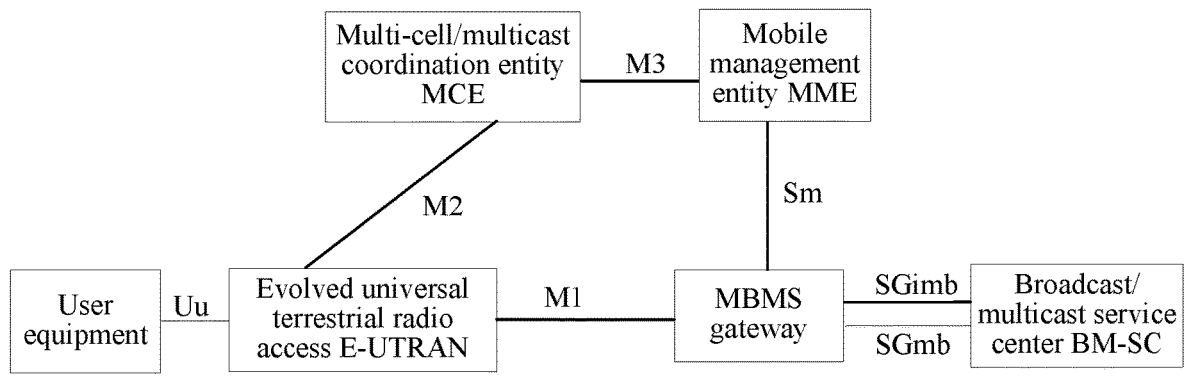
FIG. 1 is a schematic diagram of a logical architecture of an eMBMS in an LTE network.
FIG. 2 is a schematic diagram of a FLUTE file.

As shown in FIG. 1, FIG. 1 is a schematic diagram of a logical architecture of an eMBMS in an LTE network. The eMBMS mainly includes a broadcast/multicast service center (BM-SC), an MBMS gateway (MBMS-GW), a mobile management entity (MME), a multi-cell/multicast coordination entity (MCE), and an evolved universal terrestrial radio access E-UTRAN. The MCE is mainly configured to schedule a service, that is, select an appropriate resource (which includes parameters such as frequency and time) to perform multimedia broadcast multicast service single frequency network (Multimedia Broadcast multicast service Single Frequency Network, BSFN) transmission. The MME is a control plane network element node and is mainly configured to control a session. The MBMS-GW, as a node between the BM-SC and the E-UTRAN, is an access gateway of a network and is responsible for processing a packet related to user data and signaling related to a session. The BM-SC is a service layer network element and is an entrance of a content provider, and provides convergence and sending of services, authorization of a user, establishment and initiation of a service bearer, initiation of session control, and the like.

Generally, before transmitting content of a service, the BM-SC needs to convert content of the to-be-transmitted service into multiple FLUTE files. As shown in FIG. 2, each file has a corresponding URI, and the URI may uniquely identify the file or a data source. Before each file is transmitted, the file is divided into multiple objects, and each object is identified by using a TOI. In a symbol-based FLUTE file transmission mechanism, each object is further divided into at least one source block, and each source block is identified by using a source block number (SBN). Each source block is further divided into source symbols of a same size, the BM-SC then obtains parity symbols of the source symbols by means of a forward error correction (FEC) algorithm, and finally, the BM-SC encapsulates source symbols and parity symbols that belong to a same file into a FLUTE packet, sends the FLUTE packet to user equipment by means of a FLUTE session channel, and completes transmission of the file. A source symbol and a parity symbol are collectively referred to as an encoding symbol, and the encoding symbol may be identified by using an encoding symbol identifier (ESI). In a byte-based FLUTE file transmission mechanism, with a byte as a unit, each object is further divided into at least one byte, and the BM-SC encapsulates bytes that belong to a same file into a FLUTE packet, and sends the FLUTE packet to user equipment by means of a FLUTE session channel.

However, in a transmission process of a FLUTE packet, data may be lost or damaged; in this case, the user equipment may request, by means of a file repair request message, the BM-SC to repair data, where the file repair request includes a URI of a file, so that the BM-SC may re-transmit the related file or partial data of the related file by means of information such as the URI of the file. Upon analysis, the inventor finds that, in the case of a multi-FLUTE-session feature, content of a same service may be transmitted in multiple FLUTE sessions. Although files transmitted in the multiple FLUTE sessions are different, URIs of the files are the same. Therefore, by using the solution of the prior art, the BM-SC cannot determine a FLUTE session over which a to-be-repaired file of the UE is transmitted, and cannot obtain correct data.

According to the file repair method provided in this embodiment of the present application, user equipment may add, to a file repair request message, a transmit session identifier of a FLUTE session that is used to transmit file data to be repaired, so that a BM-SC can perceive a FLUTE session over which the file data to be repaired is transmitted, and the BM-SC can obtain repair data of the file data according to information such as the transmit session identifier, thereby implementing file repair, and resolving a prior-art problem that file repair cannot be processed in the case of a multi-FLUTE-session feature.

The technical solutions of the embodiments of the present application are clearly described in the following with reference to the accompanying drawings of the embodiments of the present application. It should be noted that in each embodiment of the present application, the BM-SC may be a file repair server. In general cases, the file repair server appears in the form of a sub-function of associated delivery functions of a network entity BM-SC.

Figure 3:
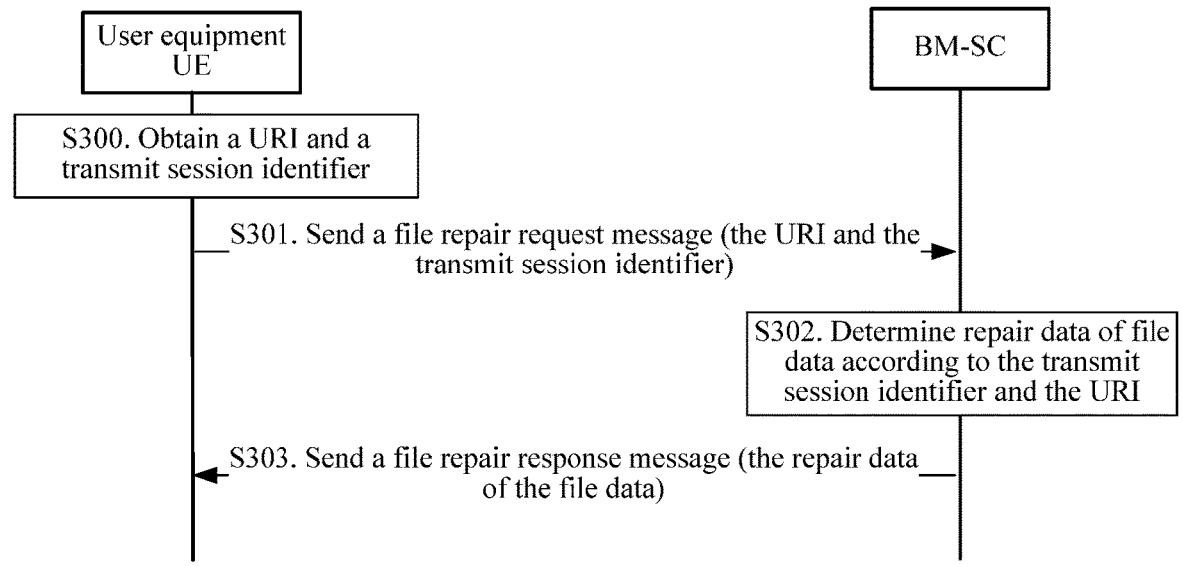
FIG. 3 is a flowchart of a file repair method according to an embodiment of the present application.

As shown in FIG. 3, an embodiment of the present application provides a file repair method. For ease of understanding, in this embodiment of the present application, a detailed process in which user equipment interacts with a BM-SC to perform file repair is provided. In an actual application, only some steps of the file repair method provided in this embodiment of the present application may be performed, or the file repair method may be applied to only the user equipment or applied to only the BM-SC. This is not limited in this embodiment of the present application.

S300: The user equipment obtains a URI corresponding to file data to be repaired and a transmit session identifier of a FLUTE session that transmits the file data.

In this embodiment of the present application, the BM-SC includes at least one server (Server), the server is a logical functional module of the BM-SC, each server may provide at least one service for the user equipment, and content of services provided by a same server has a same URI. Before content of a service is transmitted, content of the to-be-transmitted service is converted to multiple FLUTE files; therefore, files corresponding to content of a same service have a same URI. The URI can uniquely identify the files or a data source. Therefore, the URI may be referred to as a URI of file, or may be referred to as a server URI. That is, the URI corresponding to the file data to be repaired may refer to a URI of a file corresponding to the file data to be repaired, or may refer to a URI of a server that provides the file data to be repaired. This is not limited in this embodiment of the present application.

When the BM-SC transmits a file to the user equipment by using a FLUTE session, the user equipment may save a transmit session identifier of the FLUTE session that transmits the file. In the case of a multi-FLUTE-session feature, for a given IP source address, there may be multiple FLUTE sessions, and a transmit session identifier is used to uniquely identify a particular FLUTE session of the given IP source address. By using the transmit session identifier, one FLUTE session can be uniquely determined, and in this way, when determining that the file has data loss or damage, the user equipment may obtain the transmit session identifier, so that the BM-SC can perceive a FLUTE session in which the data loss or damage occurs.

In this embodiment of the present application, S300 is an optional step.

S301: The user equipment sends a file repair request message to the BM-SC, where the file repair request message includes a URI corresponding to the file data and the transmit session identifier of the FLUTE session that transmits the file data.

The user equipment may send the file repair request message to the BM-SC by using a Hypertext Transfer Protocol (HTTP) get request.

Different from the prior art, in this embodiment of the present application, when finding that file data is lost or damaged, the user equipment not only sends the URI corresponding to the file data to the BM-SC, but also further sends, to the BM-SC, the transmit session identifier of the FLUTE session that transmits the file data, so that the BM-SC can identify the FLUTE session that transmits the file data, and further obtain repair data of the file data, thereby completing file repair.

S302: The BM-SC receives the file repair request message sent by the user equipment, and determines repair data of the file data according to the transmit session identifier and the URI corresponding to the file data that are included in the file repair request message.

The BM-SC may determine, according to the transmit session identifier, the FLUTE session that transmits the file data, and determine the repair data of the file data according to the FLUTE session that transmits the file data and the URI corresponding to the file data. The repair data of the file data may be data in at least one of the following forms: a FLUTE file corresponding to the file data, an encoding symbol of the file data, a new encoding symbol obtained after re-encoding is performed according to the encoding symbol of the file data, and a byte corresponding to the file data. Because the repair data of the file data includes all information of the file data, the BM-SC implements repair of the file data.

Specifically, because granularities of file data repair are different, in this embodiment of the present application, the file repair request message may be a symbol-based file repair request message, or may be a byte-range-based file repair request message. The symbol-based file repair request message may be applied to a scenario in which some particular encoding symbols need to be repaired, a URI corresponding to the file data included in the symbol-based file repair request message may be determined by an element postFileRepair of an associated delivery procedure fragment; the byte-range-based file repair request message may be applied to file repair for some or all bytes of the file, and a URI corresponding to the file data included in the byte-range-based file repair request message may be determined by elements such as "Alternate-Content-Location-1" and "Alternate-Content-Location-2" in a file delivery table (FDT).

If the file repair request message is a symbol-based file repair request message, the file repair request message includes the URI corresponding to the file data and the transmit session identifier, and may further include an SBN of the file data or an ESI of the file data. For example, if a file is completely lost or damaged, the file repair request message may only carry a URI of the file and a transmit session identifier of a FLUTE session that transmits the file; if a source block that is not received and that is in a particular file is requested to be repaired, the file repair request message may include a URI of the particular file, a transmit session identifier, and an SBN range, and the SBN range may be used to indicate a first lost source block to a final lost source block; if a source symbol that is not received and that is of a particular source block is requested to be repaired, the file repair request message may include a URI of the file, a transmit session identifier, an SBN of the particular source block, and an ESI used to indicate/identify the source symbol that is not received. Therefore, the BM-SC may obtain, according to information included in the file repair request message, repair data such as a particular FLUTE file, an encoding symbol of the source block that is not received, or an encoding symbol of the source symbol that is not received.

If the file repair request message is a byte-range-based file repair request message, in addition to the URI corresponding to the file data and the transmit session identifier, the file repair request message may further include a byte range of the file data. The byte range of the file data is a byte range corresponding to the file data to be repaired. For example, if all source blocks of a file are requested, the file repair request message may include only a URI and a transmit session identifier of a FLUTE session that transmits the file; if some particular source blocks are requested, the file repair request message may include a URI, a transmit session identifier, and a to-be-repaired byte range, and the byte range may be used to indicate the particular source block; if a part of the particular source block is to be repaired, the file repair request message may further include a value of a minimum ESI of this part. Therefore, the BM-SC may obtain, according to information included in the file repair request message, repair data such as a particular FLUTE file, or a byte corresponding to the source block that is not received.

S303: The BM-SC sends a file repair response message to the user equipment, where the file repair response message includes the repair data of the file data.

The BM-SC may return the file repair response message to the user equipment by using an HTTP response request, and the file repair response may include the repair data of the file data, so that file repair of the file data is implemented. The file repair response message may be a byte-based file repair response message, or may be a byte-range-based file repair response message. In this embodiment of the present application, a file repair request message of a particular MBMS service and a file repair response message may be both transmitted by means of a same TCP connection according to the HTTP protocol.

Corresponding to the embodiment described in FIG. 3, if the file repair method described in FIG. 3 is applied to a BM-SC, the method may be specifically as follows:

S401: The BM-SC receives a file repair request message sent by user equipment, where the file repair request message includes a URI corresponding to file data to be repaired and a transmit session identifier of a FLUTE session that transmits the file data.

Optionally, the file repair request message further includes at least one type of information of: an SBN of the file data, an ESI of the file data, or a byte range of the file data, and the information may identify/indicate the file data.

S402: The BM-SC determines repair data of the file data according to the transmit session identifier and the URI corresponding to the file data.

The BM-SC may determine, according to the transmit session identifier, the FLUTE session that transmits the file data, and then determine the repair data of the file data according to the FLUTE session that transmits the file data and the URI corresponding to the file data. Specifically, the broadcast/multicast service center obtains a FLUTE file corresponding to the file data according to the transmit session identifier and the URI corresponding to the file data, where the repair data of the file data is the FLUTE file corresponding to the file data, or the broadcast/multicast service center determines the encoding symbol of the file data according to the SBN of the file data or the ESI of the file data, the transmit session identifier, and the URI corresponding to the file data, where the repair data of the file data is the encoding symbol of the file data, or the broadcast/multicast service center determines the encoding symbol of the file data according to the SBN of the file data or the ESI of the file data, the transmit session identifier, and the URI corresponding to the file data, and performs re-encoding according to the encoding symbol of the file data to obtain a new encoding symbol, where the repair data of the file data is the encoding symbol of the file data, or the broadcast/multicast service center determines a byte corresponding to the file data according to the transmit session identifier, the URI corresponding to the file data, and the byte range of the file data, where the repair data of the file data is the byte corresponding to the file data.

Optionally, the repair data of the file data is data in at least one of the following forms: a FLUTE file corresponding to the file data, an encoding symbol of the file data, a new encoding symbol obtained after re-encoding is performed according to the encoding symbol of the file data, and a byte corresponding to the file data. Because the repair data of the file data includes all information of the file data, repair of the file data is implemented, and a prior-art problem that file repair cannot be processed in the case of a multi-FLUTE-session feature is resolved.

S403: The BM-SC sends the repair data of the file data to the user equipment. Specifically, the repair data of the file data may be sent to the user equipment by means of a file repair response message, and refer to S303 for details.

Corresponding to the embodiment described in FIG. 3, if the file repair method described in FIG. 3 is applied to user equipment, the method may be specifically as follows:

S501: The user equipment sends a file repair request message to a broadcast/multicast service center, where the file repair request message includes a URI corresponding to file data to be repaired and a transmit session identifier of a FLUTE session that transmits the file data.

S502: The user equipment receives repair data of the file data, the repair data of the file data being returned by the broadcast/multicast service center according to the file repair request message. For details, refer to the embodiment corresponding to FIG. 3.

Optionally, before sending the file repair request message, the method may further include the following step:

S500: The user equipment obtains the transmit session identifier.

Figure 6:
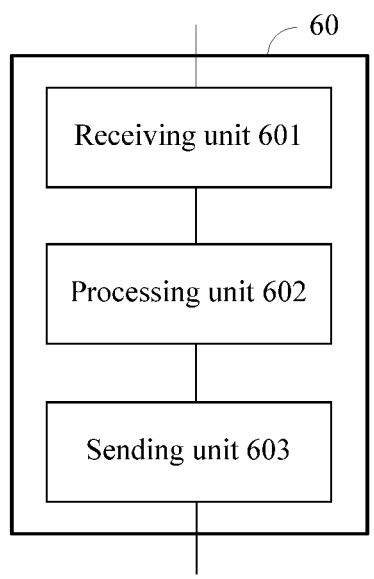
FIG. 6 is a schematic diagram of a broadcast/multicast service center according to an embodiment of the present application.

An embodiment of the present application provides a broadcast/multicast service center 60. As shown in FIG. 6, the broadcast/multicast service center 60 includes a receiving unit 601, a processing unit 602, and a sending unit 603.

The receiving unit 601 is configured to receive a file repair request message sent by user equipment, where the file repair request message includes a URI corresponding to file data to be repaired and a transmit session identifier of a FLUTE session that transmits the file data. Optionally, the file repair request message may further include at least one type of information of: an SBN of the file data, an ESI of the file data, or a byte range of the file data, and the information may identify/indicate the file data.

The processor 602 is configured to determine repair data of the file data according to the transmit session identifier and the URI corresponding to the file data. Specifically, the processing unit 602 may determine, according to the transmit session identifier, the FLUTE session that transmits the file data, and determine the repair data of the file data according to the FLUTE session that transmits the file data and the URI corresponding to the file data. For example, the processing unit 602 may obtain a FLUTE file corresponding to the file data according to the transmit session identifier and the URI corresponding to the file data, where the repair data of the file data is the FLUTE file corresponding to the file data; or the processing unit 602 may determine an encoding symbol of the file data according to the SBN of the file data or the ESI of the file data, the transmit session identifier, and the URI corresponding to the file data, where the repair data of the file data is the encoding symbol of the file data; or the processing unit 602 may determine the encoding symbol of the file data according to the SBN of the file data or the ESI of the file data, the transmit session identifier, and the URI corresponding to the file data, and perform re-encoding according to the encoding symbol of the file data to obtain a new encoding symbol, where the repair data of the file data is the encoding symbol of the file data; or the processing unit 602 may determine a byte corresponding to the file data according to the transmit session identifier, the URI corresponding to the file data, and the byte range of the file data, where the repair data of the file data is the byte corresponding to the file data. Optionally, the repair data of the file data is data in at least one of the following forms: a FLUTE file corresponding to the file data, an encoding symbol of the file data, a new encoding symbol obtained after re-encoding is performed according to the encoding symbol of the file data, and a byte corresponding to the file data.

The sending unit 603 is configured to send the repair data of the file data to the user equipment. Specifically, the repair data of the file data may be sent to the user equipment by means of a file repair response message.

For a specific manner in which the broadcast/multicast service center 60 provided in this embodiment of the present application implements file repair, further refer to the method embodiment described in FIG. 3, and details are not described again in this embodiment of the present application.

In this embodiment of the present application, the receiving unit 601 may receive a file repair request message sent by user equipment and obtain a URI corresponding to file data to be repaired and a transmit session identifier of a FLUTE session that transmits the file data, so that the processing unit 602 may determine repair data of the file data according to the transmit session identifier and the URI corresponding to the file data, and the sending unit 603 may send the repair data of the file data to the user equipment, thereby implementing file repair, and resolving a prior-art problem that file repair cannot be processed in the case of a multi-FLUTE-session feature.

Figure 7:
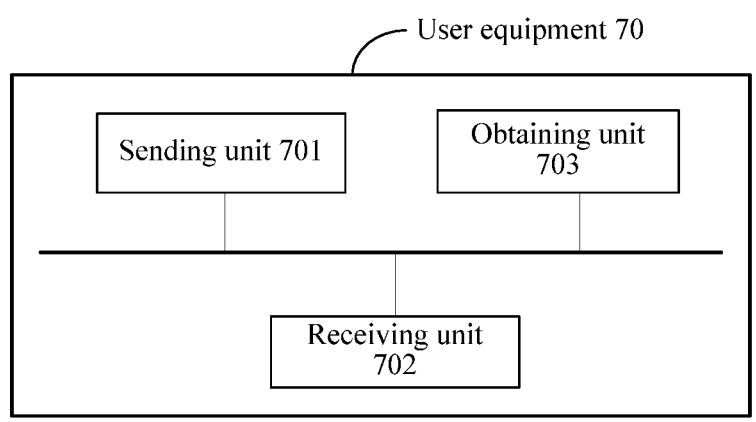
FIG. 7 is a schematic diagram of user equipment according to an embodiment of the present application.

An embodiment of the present application provides user equipment 70. As shown in FIG. 7, the user equipment 70 includes a sending unit 701 and a receiving unit 702.

The sending unit 701 is configured to send a file repair request message to a BM-SC, where the file repair request message includes a URI corresponding to file data to be repaired and a transmit session identifier of a FLUTE session that transmits the file data.

The receiving unit 702 is configured to receive repair data of the file data, the repair data of the file data being returned by the BM-SC according to the file repair request message. Optionally, the repair data of the file data is data in at least one of the following forms: a FLUTE file corresponding to the file data, an encoding symbol of the file data, a new encoding symbol obtained after re-encoding is performed according to the encoding symbol of the file data, and a byte corresponding to the file data. Because the repair data of the file data includes all information of the file data, repair of the file data is implemented, and a prior-art problem that file repair cannot be processed in the case of a multi-FLUTE-session feature is resolved.

Optionally, the user equipment 70 may further include an obtaining unit 703, configured to obtain the transmit session identifier. For a specific manner in which the user equipment 70 provided in this embodiment of the present application implements file repair, further refer to the method embodiment described in FIG. 3, and details are not described again in this embodiment of the present application.

In this embodiment of the present application, the user equipment 70 may add, to a file repair request message, a transmit session identifier of a FLUTE session that is used to transmit file data to be repaired, so that a BM-SC and the user equipment 70 can perceive a FLUTE session over which the file data to be repaired is transmitted, and the BM-SC can obtain and return repair data of the file data to the user equipment 70 according to information such as the transmit session identifier, thereby implementing file repair, and resolving a prior-art problem that file repair cannot be processed in the case of a multi-FLUTE-session feature.

A person skilled in the art can understand that in the embodiments of FIG. 6 and FIG. 7, the sending unit configured to send a message may be implemented by using a transmitter or a transceiver, and a receiving unit configured to receive a message may be implemented by using a receiver or a transceiver. In physical implementation, the transmitter or the transceiver may be implemented by using one physical entity, or may be implemented by using multiple physical entities, and the receiver and the transceiver may be implemented by using one physical entity, or may also be implemented by using multiple physical entities. This is not limited in the present application. Other units, such as the obtaining unit or the processing unit, may be implemented by using one or more processors. This is not limited in the present application.

Figure 8:
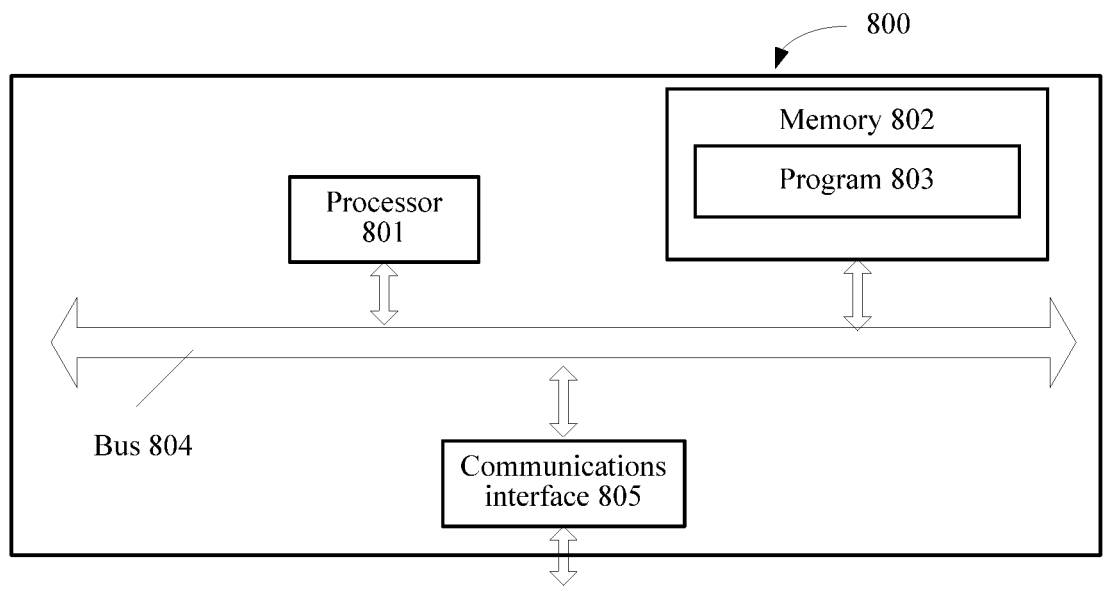
FIG. 8 is a schematic composition diagram of an apparatus used for file repair according to an embodiment of the present application.

As shown in FIG. 8, FIG. 8 shows an apparatus used for file repair according to an embodiment of the present application. The apparatus may include a processor 801, a memory 802, a bus 804, and a communications interface 805. The processor 801, the memory 802, and the communications interface 805 are connected to and communicate with each other by using the bus.

The processor 801 may be a single-core or multi-core central processing unit, or an application-specific integrated circuit, or may be configured as one or more integrated circuits for implementing this embodiment of the present application.

The memory 802 may be a high-speed RAM memory, or a non-volatile memory (non-volatile memory), such as at least one disk memory.

The memory 802 is configured to store a computer executable instruction 803. Specifically, the computer executable instruction 803 may include program code.

Figure 4:
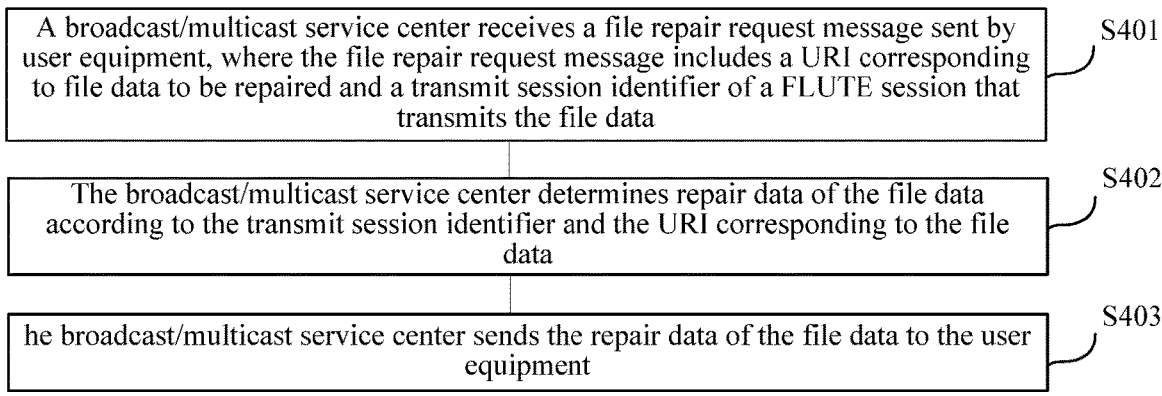
FIG. 4 is a flowchart of another file repair method according to an embodiment of the present application.
Figure 5:
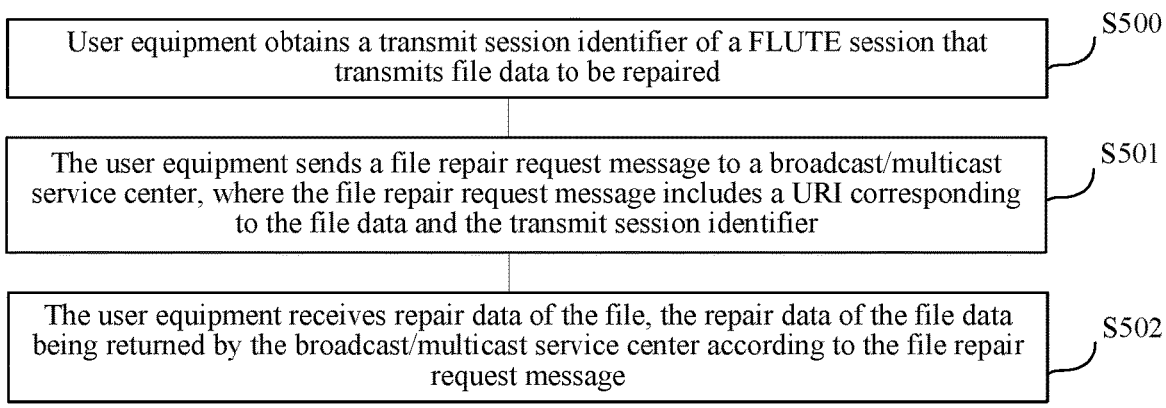
FIG. 5 is a flowchart of another file repair method according to an embodiment of the present application.

When the apparatus operates, the processor 801 runs the computer executable instruction 803 and can perform the method process of the file repair method described in the method embodiment corresponding to any one of FIG. 3 to FIG. 5. When the method process of the file repair method described in the method embodiment corresponding to FIG. 3 or FIG. 4 is performed, the apparatus may be a broadcast/multicast service center. When the method process of the file repair method described in the method embodiment corresponding to FIG. 3 or FIG. 5 is performed, the apparatus may be user equipment.

An embodiment of the present application provides a computer readable medium, which includes a computer executable instruction, and when a processor of a computer executes the computer executable instruction, the computer performs the file repair method described in the method embodiment corresponding to FIG. 3 or FIG. 4.

An embodiment of the present application provides a computer readable medium, which includes a computer executable instruction, and when a processor of a computer executes the computer executable instruction, the computer performs the file repair method described in the method embodiment corresponding to FIG. 3 or FIG. 5.

Figure 9:
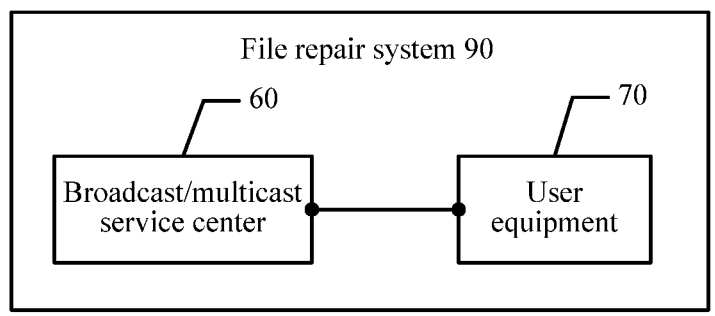
FIG. 9 is a schematic diagram of a file repair system according to an embodiment of the present application.

Referring to FIG. 9, a file repair system provided in this embodiment of the present application includes: a broadcast/multicast service center 60 and user equipment 70. For actions performed by the broadcast/multicast service center 60 and the user equipment 70 respectively and interaction between the broadcast/multicast service center 60 and the user equipment 70, refer to descriptions of the method embodiments corresponding to FIG. 3 to FIG. 5, or refer to descriptions of apparatus embodiments corresponding to FIG. 6 and FIG. 7, and details are not described herein again.

The LTE network described in the present application includes an LTE A network, and an LTE version that may appear subsequently.

A person of ordinary skill in the art may understand that, each aspect of the present application or a possible implementation manner of each aspect may be specifically implemented as a system, a method, or a computer program product. Therefore, each aspect of the present application or a possible implementation manner of each aspect may use forms of hardware only embodiments, software only embodiments (including firmware, resident software, and the like), or embodiments with a combination of software and hardware, which are uniformly referred to as "circuit", "module", or "system" herein. In addition, each aspect of the present application or the possible implementation manner of each aspect may take a form of a computer program product, where the computer program product refers to computer-readable program code stored in a computer-readable medium.

The computer-readable medium may be a computer-readable signal medium or a computer-readable storage medium. The computer-readable storage medium includes but is not limited to an electronic, magnetic, optical, electromagnetic, infrared, or semi-conductive system, device, or apparatus, or any appropriate combination thereof, such as a random access memory (RAM), a read-only memory (ROM), an erasable programmable read-only memory (EPROM or flash memory), an optical fiber, and a compact disc read-only memory (CD-ROM).

A processor in a computer reads computer-readable program code stored in a computer-readable medium, so that the processor can perform a function and an action specified in each step or a combination of steps in a flowchart; an apparatus is generated to implement a function and an action specified in each block or a combination of blocks in a block diagram.

All computer-readable program code may be executed on a user computer, or some may be executed on a user computer as a standalone software package, or some may be executed on a computer of a user while some is executed on a remote computer, or all the code may be executed on a remote computer or a computer. It should also be noted that, in some alternative implementation solutions, each step in the flowcharts or functions specified in each block in the block diagrams may not occur in the illustrated order. For example, two consecutive steps or two blocks in the illustration, which are dependent on an involved function, may actually be executed substantially at the same time, or these blocks may sometimes be executed in reverse order.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present application.

The foregoing descriptions are merely specific implementation manners of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A file repair method, comprising:
receiving, by a broadcast/multicast service center, a file repair request message sent by a user equipment, wherein the file repair request message comprises a Uniform Resource Identifier (URI) corresponding to file data to be repaired and further comprises a transmit session identifier of a File Delivery over Unidirectional Transport (FLUTE) session during which the file data is sent in a first file transmitted as part of a multi-FLUTE-session transmission sending content of a same service in multiple files comprising at least the first file, wherein each file of the multiple files has a same URI;
determining, by the broadcast/multicast service center, repair data of the file data according to the transmit session identifier and the URI corresponding to the file data; and
sending, by the broadcast/multicast service center, the repair data of the file data to the user equipment.

2. The method according to claim 1, wherein the repair data of the file data is data in at least one of a FLUTE file corresponding to the file data, an encoding symbol of the file data, a new encoding symbol obtained after re-encoding is performed according to the encoding symbol of the file data, or a byte corresponding to the file data.

3. The method according to claim 1, wherein the file repair request message further comprises at least one of a source block number (SBN) of the file data, an encoding symbol identifier (ESI) of the file data, or a byte range of the file data.

4. The method according to claim 3, wherein the determining the repair data of the file data comprises performing at least one of:
obtaining, by the broadcast/multicast service center, a FLUTE file corresponding to the file data according to the transmit session identifier and the URI corresponding to the file data, wherein the repair data of the file data is the FLUTE file corresponding to the file data; or
determining, by the broadcast/multicast service center, the encoding symbol of the file data according to the SBN of the file data or the ESI of the file data, the transmit session identifier, and the URI corresponding to the file data, wherein the repair data of the file data is the encoding symbol of the file data; or
determining, by the broadcast/multicast service center, the encoding symbol of the file data according to the SBN of the file data or the ESI of the file data, the transmit session identifier, and the URI corresponding to the file data, and performing re-encoding according to the encoding symbol of the file data to obtain a new encoding symbol, wherein the repair data of the file data is the encoding symbol of the file data; or
determining, by the broadcast/multicast service center, a byte corresponding to the file data according to the transmit session identifier, the URI corresponding to the file data, and the byte range of the file data, wherein the repair data of the file data is the byte corresponding to the file data.

5. An apparatus, comprising:
a receiver, configured to receive a file repair request message sent by a user equipment, wherein the file repair request message comprises a Uniform Resource Identifier (URI) corresponding to file data to be repaired and further comprises a transmit session identifier of a File Delivery over Unidirectional Transport (FLUTE) session during which the file data is sent in a first file transmitted as part of a multi-FLUTE-session transmission sending content of a same service in multiple files comprising at least the first file, wherein each file of the multiple files has a same URI;
a processor, configured to determine repair data of the file data according to the transmit session identifier and the URI corresponding to the file data; and
a transmitter, configured to send the repair data of the file data to the user equipment.

6. The apparatus according to claim 5, wherein the repair data of the file data is data in at least one form selected from a FLUTE file corresponding to the file data, an encoding symbol of the file data, a new encoding symbol obtained after re-encoding is performed according to the encoding symbol of the file data, or a byte corresponding to the file data.

7. The apparatus according to claim 5, wherein the file repair request message further comprises at least one of a source block number (SBN) of the file data, an encoding symbol identifier (ESI) of the file data, or a byte range of the file data.

8. The apparatus according to claim 7, wherein the processor is configured to perform at least one of:
obtain a FLUTE file corresponding to the file data according to the transmit session identifier and the URI corresponding to the file data, and wherein the repair data of the file data is the FLUTE file corresponding to the file data; or
determine the encoding symbol of the file data according to the SBN of the file data or the ESI of the file data, the transmit session identifier, and the URI corresponding to the file data, wherein the repair data of the file data is the encoding symbol of the file data; or
determine the encoding symbol of the file data according to the SBN of the file data or the ESI of the file data, the transmit session identifier, and the URI corresponding to the file data, and perform re-encoding according to the encoding symbol of the file data to obtain a new encoding symbol, wherein the repair data of the file data is the encoding symbol of the file data; or
determine the byte corresponding to the file data according to the transmit session identifier, the URI corresponding to the file data, and the byte range of the file data, wherein the repair data of the file data is the byte corresponding to the file data.

9. A non-transitory machine-readable medium having stored thereon a computer program comprising at least one code section for distributing data, the at least one code section being executable by a broadcast/multicast service center for causing the broadcast/multicast service center to:
receive a file repair request message sent by user equipment, wherein the file repair request message comprises a Uniform Resource Identifier (URI) corresponding to file data to be repaired and further comprises a transmit session identifier of a File Delivery over Unidirectional Transport (FLUTE) session during which the file data is sent in a first file transmitted as part of a multi-FLUTE-session transmission sending content of a same service in multiple files comprising at least the first file, wherein each file of the multiple files has a same URI;
determine repair data of the file data according to the transmit session identifier and the URI corresponding to the file data; and
send the repair data of the file data to the user equipment.

10. The medium according to claim 9, wherein the repair data of the file data is data in at least one of a FLUTE file corresponding to the file data, an encoding symbol of the file data, a new encoding symbol obtained after re-encoding is performed according to the encoding symbol of the file data, or a byte corresponding to the file data.

11. The medium according to claim 9, wherein the file repair request message further comprises at least one of a source block number (SBN) of the file data, an encoding symbol identifier (ESI) of the file data, or a byte range of the file data.

12. The medium according to claim 11, wherein the causing the broadcast/multicast service center to determine the repair data of the file data according to the transmit session identifier and the URI corresponding to the file data comprises performing at least one of:
obtaining a FLUTE file corresponding to the file data according to the transmit session identifier and the URI corresponding to the file data, wherein the repair data of the file data is the FLUTE file corresponding to the file data; or
determining the encoding symbol of the file data according to the SBN of the file data or the ESI of the file data, the transmit session identifier, and the URI corresponding to the file data, wherein the repair data of the file data is the encoding symbol of the file data; or
determining the encoding symbol of the file data according to the SBN of the file data or the ESI of the file data, the transmit session identifier, and the URI corresponding to the file data, and performing re-encoding according to the encoding symbol of the file data to obtain a new encoding symbol, wherein the repair data of the file data is the encoding symbol of the file data; or
determining the byte corresponding to the file data according to the transmit session identifier, the URI corresponding to the file data, and the byte range of the file data, wherein the repair data of the file data is the byte corresponding to the file data.

* * * * *